Patented Mar. 15, 1938

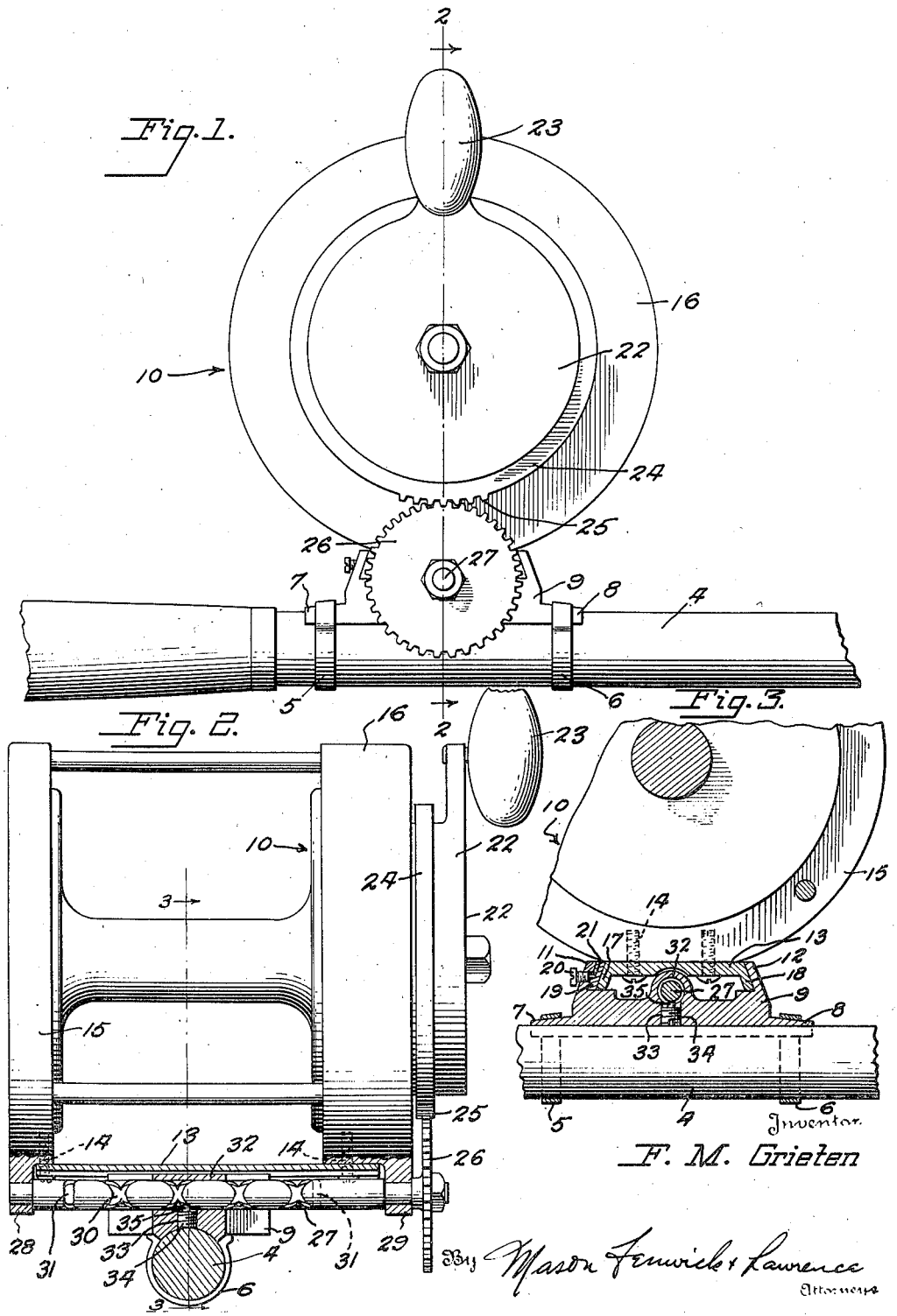

2,111,447

UNITED STATES PATENT OFFICE 2,111,447

LINE LEVELING FISHING REEL

Frederick Martin Grieten, Miami, Fla.

Application April 14, 1937, Serial No. 136,937

6 Claims. (Cl. 43—22)

The invention forming the subject matter of this application relates to fishing reels generally, and more particularly to that class of fishing reels in which provision is made for evenly distributing or laying a fishing line on the spool of the reel during the winding thereof by mechanism connecting the manually operated crank of the reel to the spool.

The invention is primarily intended for use on large reels, wherein the pull on the line is frequently as much as two hundred pounds. In the reels of the prior art, the reel is mounted in fixed position on the rod, and the line is moved laterally of the spool in the operation of distributing the line evenly on the spool. This method of level winding is fairly satisfactory in the case of small reels, where the tension on the line is not very great, and the angle of pull of the line relative to the axis of the spool does not materially affect the operation of the reel.

The main object of the present invention is to provide a fishing rod with a reel mounted thereon to slide laterally thereof during the winding of the line, so as to maintain the pull of the line substantially at right angles to the axis of the spool, and substantially in the plane passing through the axis of the rod.

Other objects of the invention will become apparent as the detailed description thereof proceeds.

In the drawing:

Figure 1 is a broken side elevation of a fishing rod having a reel mounted thereon, and constructed in accordance with this invention;

Figure 2 is a vertical section taken on the line 2—2 of Figure 1; and

Figure 3 is a vertical section taken on the line 3—3 of Figure 2.

As shown in the drawing, the invention comprises a rod 4 provided with clamping rings 5 and 6 adapted to slide on said rod over the toes 7 and 8 of a base 9 designed to support the reel designated generally by the reference numeral 10. The base 9 has its opposite side edges cast or otherwise formed to provide flanges 11 and 12 inclined toward each other to form a dovetailed groove adapted to receive slidably a plate 13 secured at its opposite ends by screws 14 to the housings 15 and 16 of the reel 10.

The supporting plate 13 is provided at its opposite edges with flanges 17 and 18 inclined at the same angle with respect to plate 13 as the flanges 11 and 12 are inclined relative to the reel base 9.

In effect, these flanges 17 and 18 constitute a dovetail tongue slidable in the dovetail groove formed by the flanges 11 and 12. The distance between the flanges 17 and 18, however, is less than the distance between the flanges 11 and 12, in order to accommodate a gib 19 which may be used for the purpose of regulating the frictional contact between the aforesaid tongue and groove. This regulation is effected by a machine screw 20 threaded into an aperture formed in the flange 11, and provided with a stud 21 projecting into a hole formed in the gib 19. It will be apparent from inspection of Figure 3 that the gib 19 will remain stationary with respect to the flange 11, and may be adjusted through the machine screw 20 to vary the frictional contact between the reel support 13 and the base 9. It will also be apparent that the screw 20 may be adjusted so as to cause the gib 19 to clamp the reel support 12 in locked position with respect to the reel base 9.

It will be understood that this invention may be applied to any suitable type of fishing reel, in which the winding-in of the line is effected manually, and in which the spool of the reel rotates freely when pull is applied to the line. As previously stated, the object of the invention is to level the line during a winding-in operation. To effect this purpose the reel crank 22, provided with the usual crank handle 23, has suitably secured thereto a mutilated gear 24. The teeth 25 of the gear 24 mesh during a portion of the rotation of the crank 22, with the teeth of a spur gear 26, which is suitably secured to one end of a screw shaft 27 journaled at its opposite ends in brackets 28 and 29 depending from the housings 15 and 16 of the reel 10. The shaft 27 is provided with oppositely pitched grooves or threads 30 joined at their opposite ends by grooves 31 designed to reverse the traverse of the reel 10 with respect to the reel base 9.

To effect the lateral movement of the reel 10 with respect to the base 9, the base 9 has formed thereon a sleeve 32 which fits snugly and slidably over the shaft 27. The base 9 is provided near the center thereof with an internally screw-threaded aperture 33, in which is adjustably mounted a screw 34 having a stud 35 projecting into the grooves 30 of the shaft 27.

In the operation of this device, it will be apparent that as the crank handle 23 is operated to wind in the line, the teeth 25 on the mutilated gear 24 will engage the teeth on the spur gear 26 to rotate the latter and the shaft 27 sufficiently to shift the reel laterally of the rod 4 to maintain the pull of the line always at right angles to the axis of the spool of said reel. So long as the winding operation continues, the reel as a whole will be moved intermittently in one direction or the other transversely of the rod, so as to maintain the direction of pull of the line constantly at right angles to the axis of the spool.

When the line is pulled out, the spool will rotate freely in the housing in the outward direction. It is quite possible that the line will not be exactly centered over the rod, when a winding-in operation is started. However, one or two turns of the crank handle will straighten out the line and arrange it so that its pull is effected directly over the axis of the rod and at right angles to the spool.

It is to be understood that the invention is not to be considered as limited to the specific construction and arrangement described herein, since it is evident that many changes may be made without departing from the scope of the invention as defined by the claims appended hereto.

What I claim is:

1. A rod, a reel base fixed to said rod, a reel mounted to slide on said base transversely of said rod, and means for intermittently sliding said reel on said base.

2. A rod, a reel base fixed to said rod, a reel mounted to slide on said base transversely of said rod, and means for intermittently sliding said reel in opposite directions on said base.

3. A rod, a reel base fixed to said rod, a reel frame mounted to slide on said base at right angles to the axis of said rod, a mutilated gear rotatable with the spool of said reel, a shaft journaled in said frame parallel to the axis of the reel spool and having intersecting oppositely inclined threads thereon, a gear on said shaft located to mesh with the teeth of said mutilated gear, and a pin on said base engaging said threads to effect intermittent sliding movement of said reel frame on said base by rotation of said shaft through engagement of the teeth of said gears.

4. In fishing tackle, a rod, a base fixed to said rod and having a guide groove extending at right angles to the axis, a reel frame having a tongue slidable in said groove, and cooperating means on said base and frame operable by winding of the reel in one direction to slide the frame intermittently in opposite directions on said base.

5. In fishing tackle, a rod, a reel base fixed to said rod, a reel frame mounted to slide in opposite directions on said base at right angles to the axis of said rod, cooperating means on said base and rod for intermittently sliding the reel on said base.

6. In fishing tackle, a rod, a reel base fixed to said rod, a reel frame mounted to slide in opposite directions on said base at right angles to the axis of said rod, cooperating means on said base and rod for intermittently sliding the reel on said base, and means for locking the reel frame in any desired position on said base.

FREDERICK MARTIN GRIETEN.